United States Patent
Kim et al.

(10) Patent No.: US 12,236,178 B2
(45) Date of Patent: Feb. 25, 2025

(54) METHODS OF GENERATING CIRCUIT MODELS AND MANUFACTURING INTEGRATED CIRCUITS USING THE SAME

(71) Applicant: Samsung Electronics Co., Ltd., Suwon-si (KR)

(72) Inventors: Yohan Kim, Gwacheon-si (KR); Changwook Jeong, Hwaseong-si (KR); Jisu Ryu, Hwaseong-si (KR)

(73) Assignee: Samsung Electronics Co., Ltd. (KR)

( * ) Notice: Subject to any disclaimer, the term of this patent is extended or adjusted under 35 U.S.C. 154(b) by 658 days.

(21) Appl. No.: 17/503,558

(22) Filed: Oct. 18, 2021

(65) Prior Publication Data
US 2022/0121800 A1 Apr. 21, 2022

(30) Foreign Application Priority Data
Oct. 19, 2020 (KR) .................. 10-2020-0135524

(51) Int. Cl.
G06F 30/367 (2020.01)
G06F 18/20 (2023.01)
G06F 119/06 (2020.01)
G06N 7/01 (2023.01)

(52) U.S. Cl.
CPC .......... *G06F 30/367* (2020.01); *G06F 18/285* (2023.01); *G06N 7/01* (2023.01); *G06F 2119/06* (2020.01)

(58) Field of Classification Search
CPC ...... G06F 30/367; G06F 2119/06; G06N 7/01
USPC ....................................... 716/100
See application file for complete search history.

(56) References Cited

U.S. PATENT DOCUMENTS

| | | |
|---|---|---|
| 7,707,533 B2 | 4/2010 | McConaghy et al. |
| 8,024,674 B2 | 9/2011 | Arimoto |
| 8,090,464 B2 | 1/2012 | Bomholt et al. |
| 8,935,146 B2 | 1/2015 | Arimoto et al. |
| 9,483,602 B2 | 11/2016 | McConaghy et al. |
| 10,018,996 B2 | 7/2018 | Bomholt et al. |
| 10,102,320 B2 | 10/2018 | Pataky |
| 10,387,596 B2 | 8/2019 | Joshi et al. |
| 10,621,494 B2 | 4/2020 | Xu et al. |

(Continued)

OTHER PUBLICATIONS

"Dasgupta, et al., "Compact Modeling of Cross-Sectional Scaling in Gate-All-Around FETs: 3-D to 1-D Transition," IEEE Transactions on Electron Devices, vol. 65, No. 3, Mar. 2018".

(Continued)

*Primary Examiner* — Jack Chiang
*Assistant Examiner* — Suchin Parihar
(74) *Attorney, Agent, or Firm* — Myers Bigel, P.A.

(57) ABSTRACT

A method of generating a circuit model used to simulate an integrated circuit may include generating first feature element data and second feature element data by classifying feature data of a target semiconductor device according to measurement conditions, generating first target data and second target data by preprocessing the first feature element data and the second feature element data, respectively, generating a first machine learning model using the first target data and extracting a second machine learning model using the second target data, and generating the circuit model used to simulate the integrated circuit using the first machine learning model and the second machine learning model.

16 Claims, 15 Drawing Sheets

(56) References Cited

U.S. PATENT DOCUMENTS

| | | | |
|---|---|---|---|
| 10,902,173 B2 | 1/2021 | Kim | |
| 11,640,556 B2* | 5/2023 | Velagapudi | G06F 18/2113 |
| | | | 706/12 |
| 11,810,002 B2* | 11/2023 | Huang | G06N 20/00 |
| 2005/0257178 A1 | 11/2005 | Daems et al. | |
| 2014/0358488 A1* | 12/2014 | Lee | G03F 7/70616 |
| | | | 702/190 |
| 2015/0142395 A1* | 5/2015 | Cao | G03F 7/70625 |
| | | | 703/1 |
| 2017/0109646 A1* | 4/2017 | David | G03F 7/70625 |
| 2018/0232630 A1* | 8/2018 | Chen | H01L 22/20 |
| 2019/0064253 A1* | 2/2019 | David | G01R 31/2642 |
| 2019/0325108 A1* | 10/2019 | Turek | G06N 3/08 |
| 2021/0056425 A1* | 2/2021 | Jeong | G06F 18/217 |
| 2021/0109453 A1* | 4/2021 | Pandev | G03F 7/70625 |
| 2021/0142122 A1* | 5/2021 | Honda | G06F 18/40 |
| 2021/0262779 A1* | 8/2021 | Wang | G01B 9/02083 |
| 2021/0294950 A1* | 9/2021 | Honda | H04B 17/3913 |
| 2021/0341396 A1* | 11/2021 | Kim | G01B 11/0616 |
| 2022/0011728 A1* | 1/2022 | Zhang | G06F 30/27 |
| 2022/0114438 A1* | 4/2022 | Pandev | G01N 21/9501 |
| 2022/0291281 A1* | 9/2022 | Chism, II | G01N 21/1717 |
| 2023/0169255 A1* | 6/2023 | Pandev | G03F 7/706841 |
| | | | 716/110 |
| 2023/0251620 A1* | 8/2023 | Apte | G06F 30/398 |
| | | | 700/121 |
| 2023/0384213 A1* | 11/2023 | Kang | G01B 11/06 |
| 2024/0028910 A1* | 1/2024 | Nam | G06N 3/10 |
| 2024/0061347 A1* | 2/2024 | Onose | G03F 7/706839 |
| 2024/0062356 A1* | 2/2024 | Xu | G06T 7/0004 |

OTHER PUBLICATIONS

"Dasgupta, et al., "Unified Compact Model for Nanowire Transistors Including Quantum Effects and Quasi-Ballistic Transport," IEEE Translations on Electron Devices, vol. 64, No. 4, Apr. 2017".

"E. Ko, H. Lee, J. Park and C. Shin, "Vertical Tunnel FET: Design Optimization With Triple Metal-Gate Layers," in IEEE Transactions on Electron Devices, vol. 63, No. 12, pp. 5030-5035, Dec. 2016, doi: 10.1109/TED.2016.2619372."

"K.-S. Li et al., "Sub-60mV-swing negative-capacitance FinFET without hysteresis," 2015 IEEE International Electron Devices Meeting (IEDM), 2015, pp. 22.6.1-22.6.4, doi: 10.1109/IEDM.2015.7409760."

"S. Khandelwal, A. I. Khan, J. P. Duarte, A. B. Sachid, S. Salahuddin and C. Hu, "Circuit performance analysis of negative capacitance FinFETs," 2016 IEEE Symposium on VLSI Technology, 2016, pp. 1-2, doi: 10.1109/VLSIT.2016.7573446."

\* cited by examiner

FIG. 3

| TARGET SEMICONDUTOR DEVICE FOR MODELING | | FEATURE ELEMENTS FOR MODELING |
|---|---|---|
| PASSIVE DEVICE | CAPACITOR | AREA CAPACITANCE + FRINGING CAPACITANCE |
| | RESISTOR | INTRINSIC RESISTANCE + VARIABLE RESISTANCE |
| ACTIVE DEVICE | BIPOLAR TRANSISTOR | HOLE CURRENT + ELECTRON CURRENT |
| | UNIPOLAR TRANSISTOR | TRANSPORT CURRENT + BODY CURRENT + TUNNELING CURRENT |

METHODS OF GENERATING CIRCUIT MODELS AND MANUFACTURING INTEGRATED CIRCUITS USING THE SAME

CROSS-REFERENCE TO RELATED APPLICATION

This application is based on and claims priority under 35 U.S.C. § 119 to Korean Patent Application No. 10-2020-0135524, filed on Oct. 19, 2020, in the Korean Intellectual Property Office, the disclosure of which is incorporated by reference herein in its entirety.

BACKGROUND

The present disclosure relates to methods of generating circuit models and integrated circuits for analyzing the properties of semiconductor devices and to designing and manufacturing the integrated circuits using the generated circuit models.

As semiconductors have become highly integrated and micronized, factors in each stage of designing and manufacturing semiconductor devices have becoming increasingly complex. Accordingly, various unintended electrical properties have occurred in semiconductor devices. In order to overcome the limitations of semiconductor processes and devices, understand the phenomena, and reduce the cost of experiments, demand within the semiconductor industry for Technology Computer Aided Design (TCAD) process-device simulation environments based on physical simulation is increasing. In addition, in order to provide accurate product specifications of semiconductor devices, it may be desirable to predict and simulate the properties of semiconductor devices.

Modeling techniques may be used to estimate objects or phenomena having a causal relationship, and models created through modeling techniques may be used to predict or optimize objects or phenomena. For example, machine learning models may be created by training (or learning) based on massive sample data, and rule-based models may be generated by at least one rule defined based on physical laws or the like.

SUMMARY

The present disclosure relates to methods of manufacturing integrated circuits capable of more accurately predicting the electrical properties of a semiconductor device included in an integrated circuit by generating circuit models with improved consistency with the properties of the semiconductor device.

According to some aspects of the present disclosure, a method of generating a circuit model used to simulate an integrated circuit may include generating first feature element data and second feature element data by classifying feature data of a target semiconductor device according to measurement conditions, generating first target data and second target data by preprocessing the first feature element data and the second feature element data, respectively, extracting a first machine learning model using the first target data and extracting a second machine learning model using the second target data, and generating the circuit model used to simulate the integrated circuit by using the first machine learning model and the second machine learning model.

According to some aspects of the present disclosure, an integrated circuit manufacturing method may include generating first feature element data and second feature element data by classifying feature data of a target semiconductor device according to measurement conditions, generating first target data and second target data by preprocessing the first feature element data and the second feature element data, respectively, extracting a first machine learning model by using the first target data, and generating a circuit model corresponding to the target semiconductor device by using the first machine learning model.

According to some aspects of the present disclosure, an integrated circuit manufacturing method may include classifying feature data of a target semiconductor device according to measurement conditions as feature element data based on a plurality of feature elements of the target semiconductor device, where the feature elements are independent of each other, generating target data by preprocessing feature element data corresponding respectively to the plurality of feature elements, extracting machine learning models corresponding to the plurality of feature elements, respectively, by using the target data, and generating a circuit model corresponding to the target semiconductor device using the machine learning models.

BRIEF DESCRIPTION OF THE DRAWINGS

Embodiments of the inventive concepts will be more clearly understood from the following detailed description taken in conjunction with the accompanying drawings in which:

FIG. 3 is a diagram illustrating an example of a feature element classification operation of FIG. 2;

DETAILED DESCRIPTION OF THE EMBODIMENTS

Hereinafter, some exemplary embodiments of the present disclosure will be described in detail with reference to the accompanying drawings.

Figure 1:
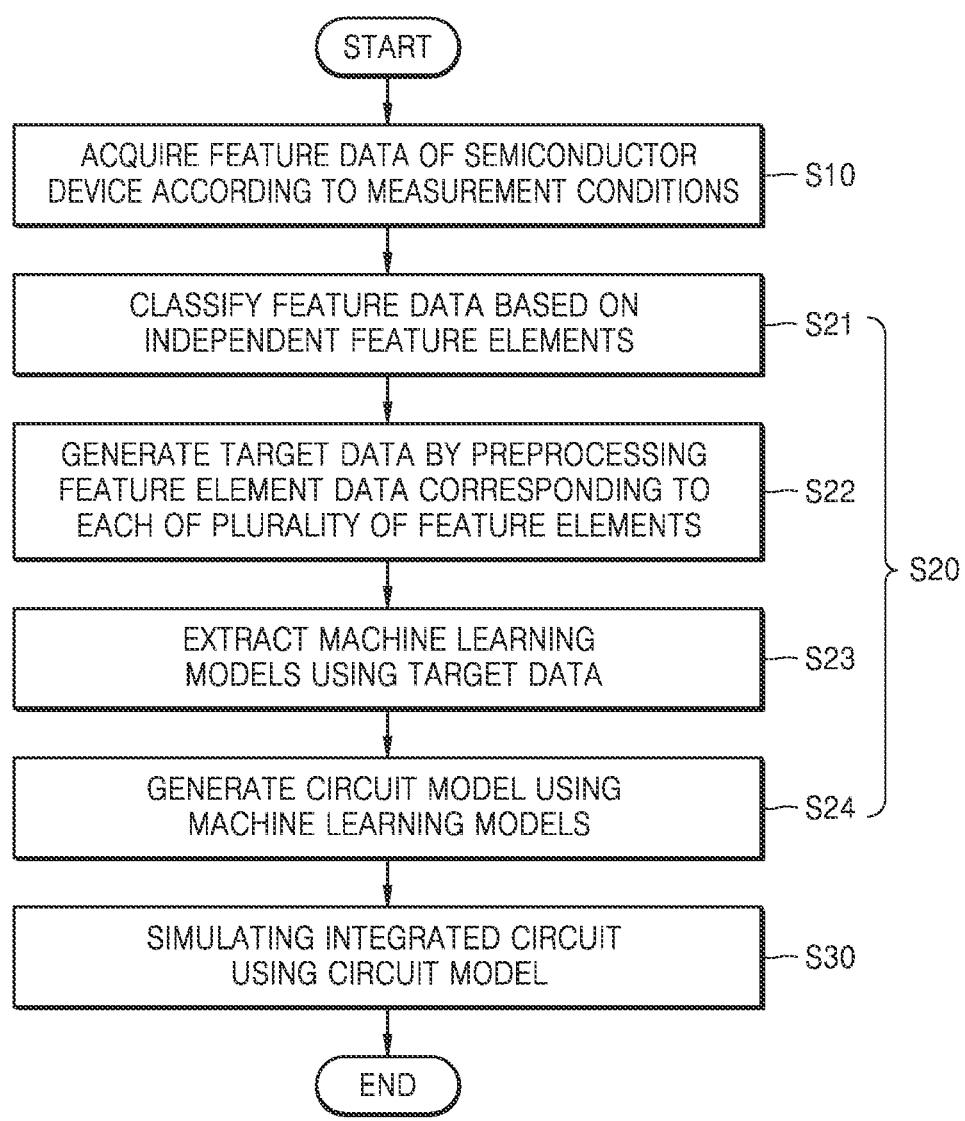
FIG. 1 is a flowchart showing a method of manufacturing an integrated circuit, according to some exemplary embodiments of the present disclosure.

FIG. 1 is a flowchart showing a method of manufacturing an integrated circuit, according to some exemplary embodiments of the present disclosure. Specifically, the flowchart of FIG. 1 shows a method of designing an integrated circuit for performing a simulation of an integrated circuit using a circuit model.

Referring to FIG. 1, in operation S10, an operation of acquiring feature data of a semiconductor device according to measurement conditions may be performed. For example, feature data of a semiconductor device may be obtained through a method of measuring electrical properties by a test element group (TEG). For example, by fabricating a TEG on a wafer and measuring electrical properties according to measurement conditions from the wafer having the TEG, feature data of a semiconductor device may be obtained.

In operation S20, an operation of generating a circuit model by modeling properties of a semiconductor device may be performed. The circuit model generated in operation S20 may be implemented in an arbitrary computing system (e.g., 170 of FIG. 13) to model one or more objects and/or phenomena. In some embodiments, the circuit model may be implemented in a stand-alone computing system, while in some embodiments the circuit model may be implemented in distributed computing systems capable of communicating with each other through a network or the like. In addition, the circuit model may include a part implemented by a processor executing a program including a series of instructions, and/or the circuit model may include a part implemented by logic hardware designed by logic synthesis. In this specification, the processor may refer to any hardware-implemented data processing device that includes a physically structured circuit to execute predefined operations. The predefined operations may include the series of instructions included in the program and/or operations expressed in code. For example, the data processing device may be or may include a microprocessor, a central processing unit (CPU), a graphics processing unit (GPU), a neural processing unit (NPU), a processor core, a multi-core processor, a multi-processor, an application-specific integrated circuit (ASIC), an application-specific instruction-set processor (ASIP), and/or a field programmable gate array (FPGA), as examples. In some exemplary embodiments, operation S20 may include operations S21 to S24.

In operation S21, an operation of classifying feature data of a semiconductor device based on a plurality of feature elements independent from each other may be performed, and accordingly, feature element data may be generated. One feature of a semiconductor device may be composed of a plurality of feature elements, and feature data for the one feature may be classified into different feature element data corresponding to each of the plurality of feature elements. For example, one resistance may be composed of an intrinsic resistance and a variable resistance, and feature data for the resistance may be classified into feature element data corresponding to the intrinsic resistance and feature element data for the variable resistance.

In operation S22, an operation of generating target data by preprocessing feature element data of each of a plurality of classified feature elements may be performed. Thereafter, a preprocessing operation of improving the accuracy of the machine learning model extracted in operation S23 may be performed. A detailed description of operation S22 will be described later with reference to FIG. 2.

In operation S23, machine learning models may be extracted using preprocessed feature element data. For example, in operation S23, regression models corresponding to each of the different preprocessed feature element data may be selected. As model parameters of each of the regression models are extracted through machine learning, machine learning models may be extracted. A detailed description of operation S23 will be described later with reference to FIG. 5.

In operation S24, an operation of generating a circuit model may be performed using the extracted machine learning models. The circuit model may be programmed to be mounted on a simulation tool for simulating an integrated circuit. The simulation tool may be an Electronic Design Automation (EDA) tool. For example, the EDA tool may be a Simulation Program with Integrated Circuit Emphasis (SPICE) tool. The extracted machine learning model may be included in a Process Design Kit (PDK) used in the tool.

Figure 15:
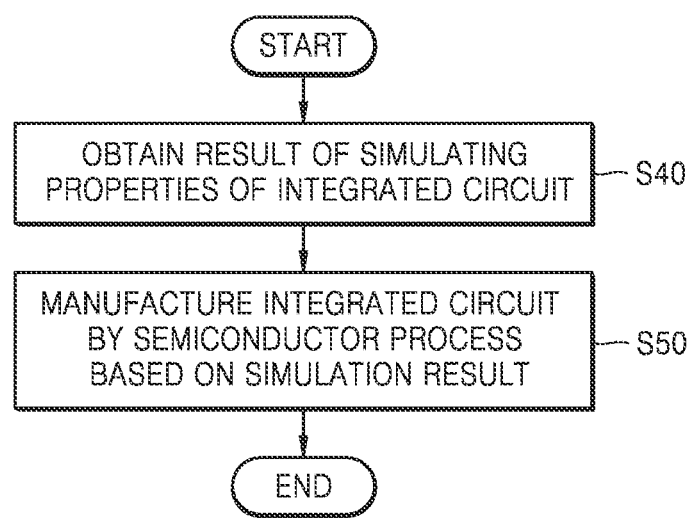
FIG. 15 is a flowchart illustrating a method of manufacturing an integrated circuit, according to some exemplary embodiments of the present disclosure.

In operation S30, an operation of simulating an integrated circuit may be performed using the circuit model generated in operation S20. As shown in FIG. 15, after operation S30, based on the result of simulating the integrated circuit, an operation of manufacturing an integrated circuit may be performed by a semiconductor process.

The method of manufacturing an integrated circuit according to the inventive concepts of the present disclosure may generate a circuit model used to simulate electrical properties of the integrated circuit through machine learning. A more accurate circuit model corresponding to a process condition range between different process conditions for manufacturing semiconductor devices may be provided, and as the consistency of the circuit model is improved, the electrical properties of semiconductor devices included in the integrated circuit may be more accurately predicted.

Figure 2:
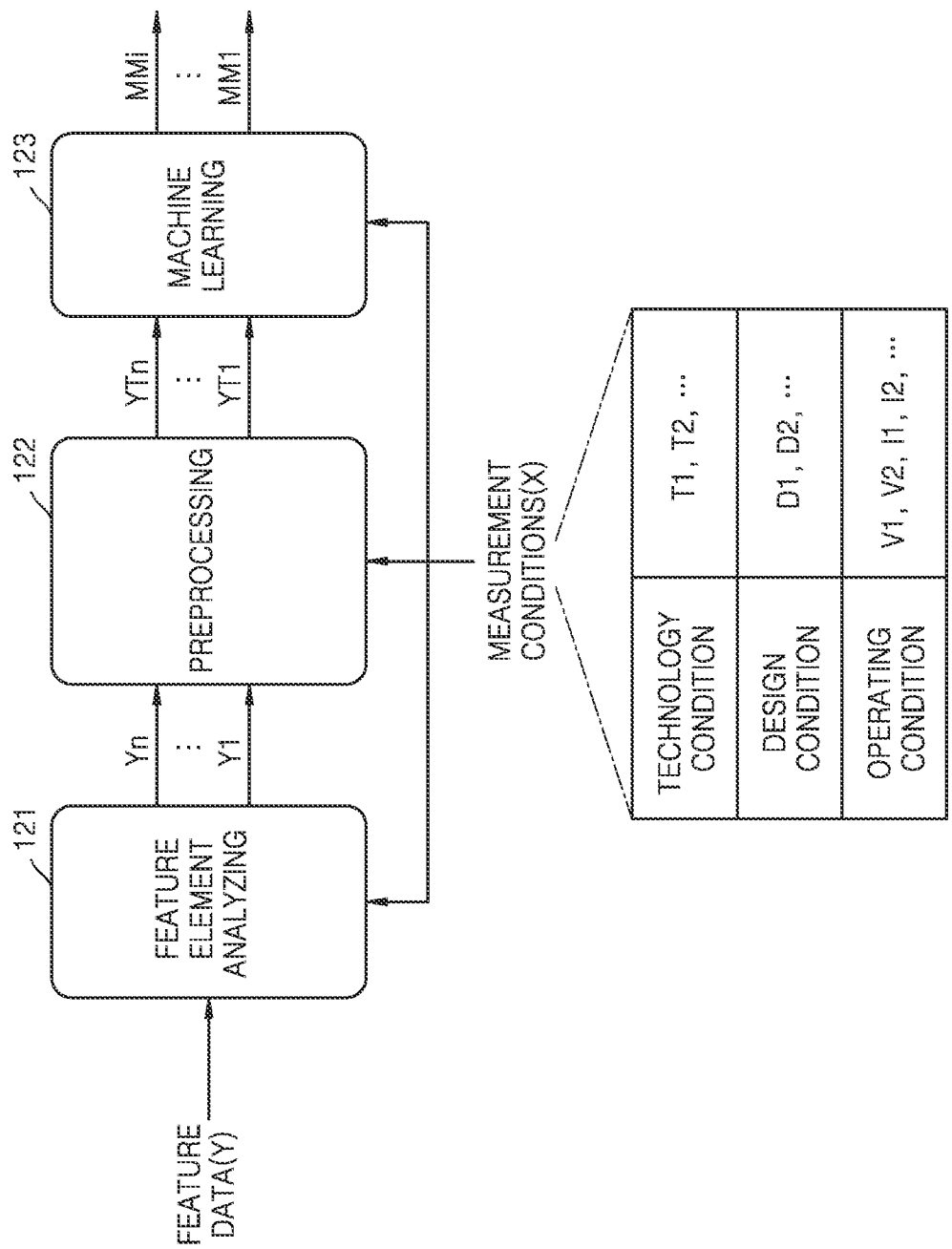
FIG. 2 is a diagram illustrating an example of an operation of generating a circuit model by modeling properties of the semiconductor device of FIG. 1.
Figure 4:
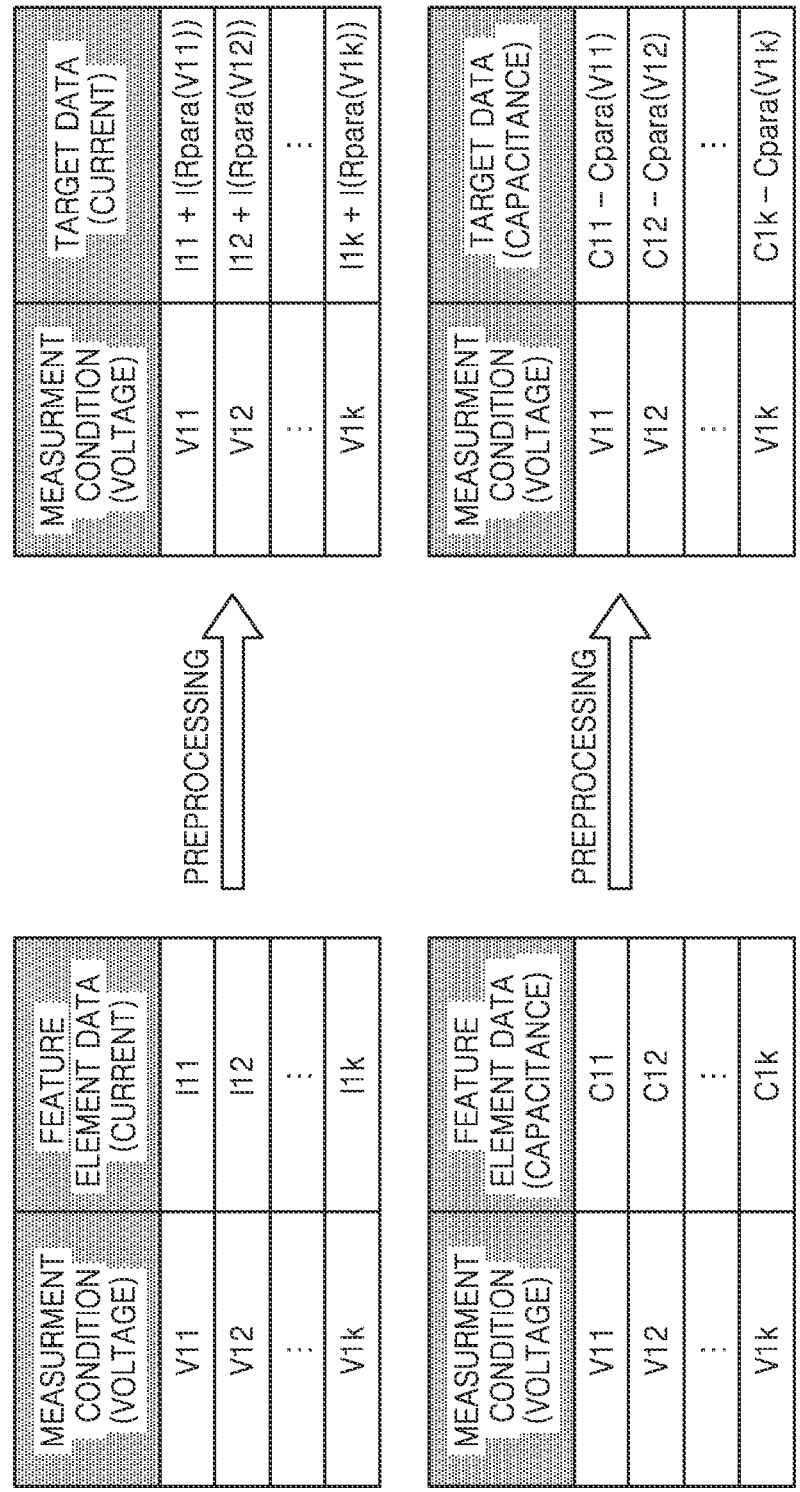
FIG. 4 is a diagram for describing an example of a preprocessing operation of FIG. 2.

FIG. 2 is a diagram illustrating an example of an operation of generating a circuit model by modeling properties of the semiconductor device of FIG. 1. FIG. 3 is a diagram illustrating an example of a feature element classification operation of FIG. 2. FIG. 4 is a diagram for describing an example of a preprocessing operation of FIG. 2.

Referring to FIG. 2, a feature element classification operation 121 may be performed using feature data Y of a target semiconductor device that changes according to changes in measurement conditions X. One feature of the target semiconductor may be classified into first to n-th feature elements, and feature data Y may be classified into first to n-th feature element data Y1 to Yn corresponding to the respective first to n-th feature elements. Each of the first to n-th feature elements may be independent and may not affect each other.

In some embodiments, n may be a natural number of 2 or more, but n may be 1 when one feature of the target semiconductor is difficult to be classified into a plurality of independent feature elements. As feature data Y is classified into first to n-th feature element data Y1 to Yn, each of the first to n-th feature elements may be individually modeled, and modeling consistency may be improved.

The measurement conditions X may include process conditions and operating conditions of the target semiconductor device. The process conditions may include technology conditions T1, T2, . . . that vary as design tools for designing the target semiconductor device are different, and design conditions D1, D2, . . . according to the physical/structural characteristics of the target semiconductor device. For example, when the target semiconductor device is a transistor, the design conditions may include a length of a gate line, a width of an active region, a channel length, a device width, a doping profile, an oxide film thickness, an oxide film dielectric constant, a channel length modulation constant, and a temperature at which the target semiconductor device is driven, as examples. The present disclosure is not limited to the above-described design conditions.

The operating condition may include environmental conditions in which the target semiconductor device operates, and the operating conditions may include voltages V1, V2, . . . inputted to the target semiconductor device or currents I1, I2, . . . inputted to the target semiconductor device. For example, when the target semiconductor device is a transistor, the operating conditions may be a body-source voltage, a drain-source voltage, and a gate-source voltage of the transistor.

Some examples of target semiconductor devices for modeling will now be discussed with reference to FIGS. 2 and 3. As a first example, the target semiconductor device for modeling may be a capacitor, which is a passive device, and capacitance values may be obtained as feature data Y in operation S10 of FIG. 1. The capacitance may be classified into an area capacitance following the general formula of capacitance, which is a property of the surface of the capacitor's plate, and a fringing capacitance, which is a property of the fringe of the capacitor's plate. That is, the area capacitance may be classified as a first feature element, and the fringing capacitance may be classified as a second feature element. Feature data Y including information on capacitance may be classified into first feature element data Y1 including information on area capacitance and second feature element data Y2 including information on fringing capacitance.

As a second example, the target semiconductor device for modeling may be a resistor that is a passive device, and resistance values may be obtained as feature data Y in operation S10 of FIG. 1. The resistance may be classified into an intrinsic resistance, which may be classified as a first feature element, and a variable resistance, which may be classified as a second feature element. Therefore, feature data including information on resistance values may be classified into first feature element data Y1 including information on intrinsic resistance values, and second feature element data Y2 including information on variable resistance values.

As a third example, the target semiconductor device for modeling may be a bipolar transistor, which is an active device, and information on the magnitude of the current flowing through the transistor may be obtained as feature data Y in operation S10 of FIG. 1. The current may be classified into hole current and electron current, and the feature data Y may be classified into first feature element data Y1 including information on hole current and second feature element data Y2 including information on electron current.

As a fourth example, the target semiconductor device for modeling may be a unipolar transistor, which is an active device, and information on the current flowing through the transistor may be acquired as feature data Y in operation S10 of FIG. 1. The current may be classified into transport current, body current, and tunneling current, and the feature data Y may be classified into first feature element data Y1 including information on the transport current, second feature element data Y2 including information on the body current, and third feature element data Y3 including information on the tunneling current.

Referring to FIGS. 2 and 4, a preprocessing operation 122 may be performed on first to n-th feature element data Y1 to Yn in order to improve the consistency of the circuit model. For example, in the preprocessing operation 122, parasitic components included in each of the first to n-th feature element data Y1 to Yn may be considered, and first to n-th feature element data Y1 to Yn corresponding to each of the measurement conditions X may be corrected. The preprocessed first to n-th feature element data may be generated as first to n-th target data YT1 to YTn. The first to n-th feature element values Y1 to Yn may be corrected considering the parasitic resistance Rpara and the parasitic capacitance Cpara generated in the target semiconductor device.

For example, when voltages V11 to V1$k$ applied to the target semiconductor device change as measurement conditions X, information on currents I11 to I1$k$ flowing through the target semiconductor device corresponding to different voltages V11 to V1$k$ may be included in the first feature element data Y1 of the feature data Y. In some embodiments, k may be a natural number greater than 3, but the present disclosure is not limited thereto, and k may be a variety of numbers. As the preprocessing operation 122 is performed, an additional current I(Rpara(V11)) to I(Rpara(V1$k$)) generated by the parasitic resistance Rpara may be added to the currents I11 to I1$k$, so that the first feature element data Y1 may be corrected with the first target data YT1.

In addition, for example, when voltages V11 to V1$k$ applied to the target semiconductor device change as measurement conditions X, information on capacitances C11 to C1$k$ of the target semiconductor device corresponding to different voltages V11 to V1$k$ may be included in the first feature element data Y1 of the feature data Y. As the preprocessing operation 122 is performed, by performing correction using the parasitic capacitances Cpara(V11) to Cpara(V1$k$) corresponding to the respective capacitances C11 to C1$k$, the first feature element data Y1 may be corrected with the first target data YT1.

Referring to FIG. 2 again, a machine learning operation 123 may be performed for extracting the first to i-th machine learning models MM1 to MMi using at least a portion of the first to n-th target data YT1 to YTn. Extracting the first to i-th machine learning models MM1 to MMi may include extracting first to i-th model parameters corresponding to the respective first to i-th machine learning models MM1 to MMi. In some exemplary embodiments, i may be a natural number equal to n. In some exemplary embodiments, i may be a natural number less than n, and the machine learning operation may not be performed on some of the first to n-th target data YT1 to YTn. At least some of the first to n-th target data YT1 to YTn on which the machine learning operation 123 is not performed may be used to generate the physical rule-based model of FIG. 10.

The machine learning operation 123 may be performed in various ways, and the machine learning models selected in the machine learning operation 123 may be trained in various ways. For example, the machine learning model may include an artificial neural network model, and as the weights of the neural network model are corrected based on values that are backward propagated from the errors, first to i-th machine learning models MM1 to MMi may be extracted.

Figure 5:
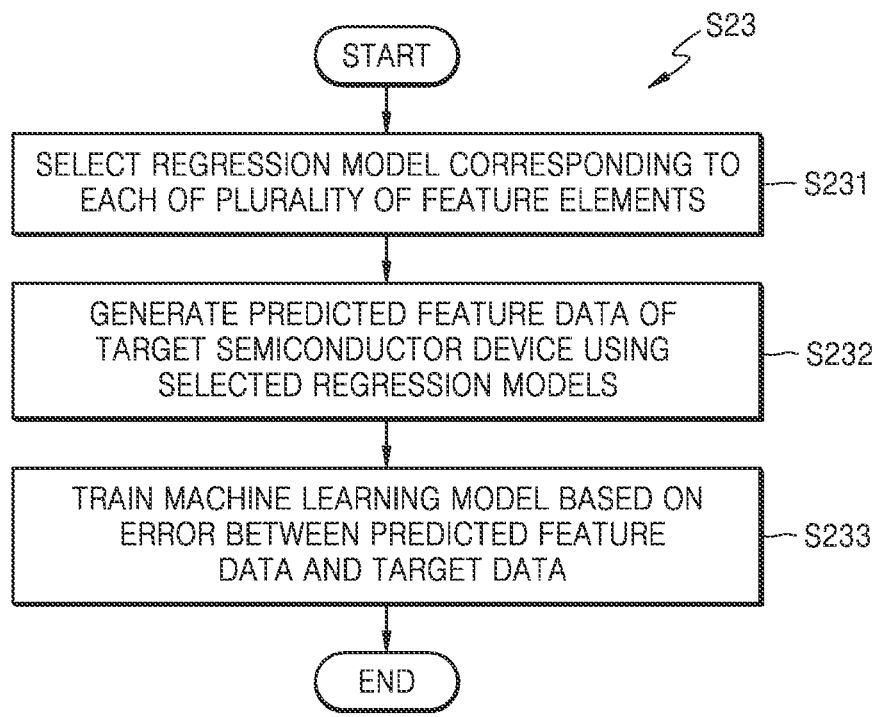
FIG. 5 is a flowchart showing a method of manufacturing an integrated circuit, according to some exemplary embodiments of the present disclosure.
Figure 6:
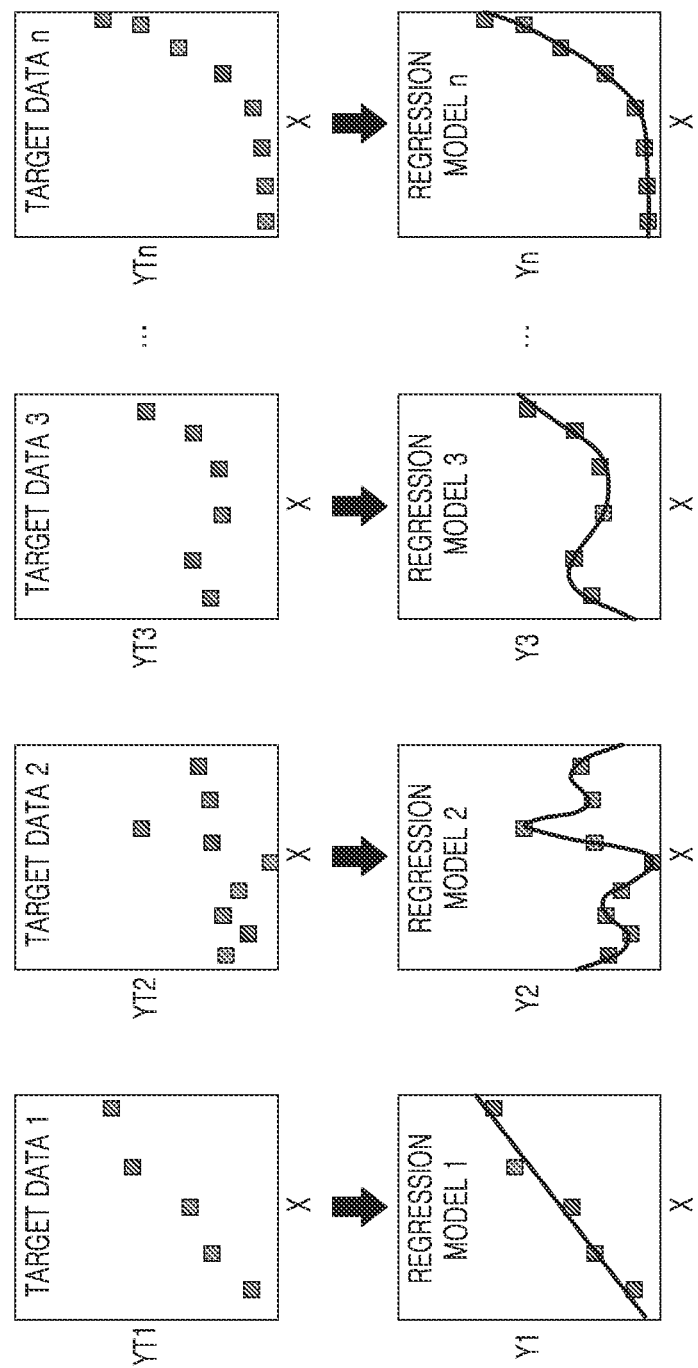
FIG. 6 is a diagram for describing an example of operation S231 of FIG. 5.

FIG. 5 is a flowchart showing a method of manufacturing an integrated circuit, according to some exemplary embodiments of the present disclosure. FIG. 6 is a diagram for describing an example of operation S231 of FIG. 5. Operation S23 of FIG. 5 may be an example of operation S23 of FIG. 1, and may include operations S231 to S233.

Referring to FIG. 5, in operation S231, an operation of selecting regression models corresponding to each of a plurality of feature elements may be performed. That is, regression models corresponding to each of a plurality of different target data may be selected.

As examples, regression models may include a linear regression model, a polynomial regression model, a neural network model such as a multilayer perceptron (fully connected neural network), a deep learning model, and a machine learning model such as reinforcement learning. The neural network model may include, for example, a convolutional neural network model and a recurrent neural network model. The present disclosure is not limited to the above-described regression models and neural network models.

Referring to FIGS. 5 and 6, in operation S231, the most optimized regression model for expressing the relationship between the measurement conditions X and the first to n-th target data YT1 to YTn may be selected. For example, a linear regression model may be selected as the most optimized regression model for the first target data YT1, the most optimized regression hypothesis for the second target data YT2 may be a multilayer perceptron model, the hypothesis that is most optimized for the third target data YT3 may be selected from a polynomial regression model, and a convolutional neural network model may be selected as the hypothesis most optimized for the n-th target data YTn.

In operation S232, an operation of generating predicted feature data of the target semiconductor device may be performed using the selected regression models. The feature data may be predicted through regression models according to predicted properties of the target semiconductor device. In operation S233, an operation of training a machine learning model may be performed based on an error between the predicted feature data and the target data. For example, an operation of correcting model parameters of a machine learning model may be repeatedly performed to reduce an error between predicted feature data and a target. Machine learning models may be trained in a variety of ways. For example, in operation S233, an automatic parameter optimization (backward propagation) through machine learning may be performed.

Figure 7:
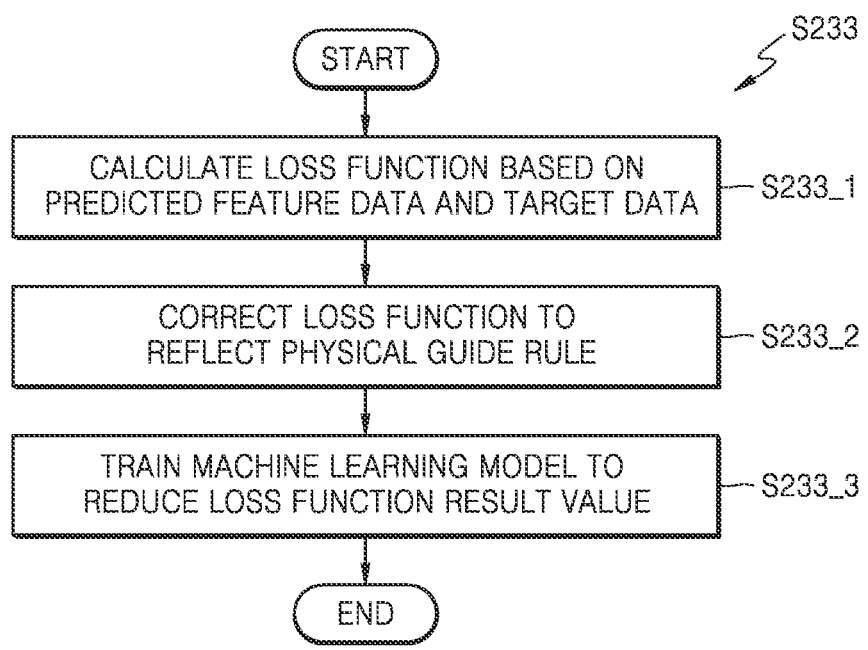
FIG. 7 is a flowchart illustrating an example of operation S233 of FIG. 5.

FIG. 7 is a flowchart illustrating an example of operation S233 of FIG. 5. Operation S233 may include operations S233_1 and S233_2.

Referring to FIG. 7, in operation S233_1, an operation of calculating a loss function based on target data and predicted feature data may be performed. The loss function may be defined to evaluate the predicted feature data, and may be referred to as a cost function. The loss function may be defined to increase as the predicted feature data is farther from the target data. That is, the loss function may be defined to increase as the errors of the predicted feature data increase.

In operation S233_2, an operation of correcting the loss function may be performed based on the physical guide rule. For example, a machine learning model may correct the loss function to satisfy the law of conservation of charge and conservation of energy. Also, the loss function may be corrected to correct the loss function for regularization, or to minimize the error of the differential value of the target data and the differential value of the predicted feature data, or the loss function may be corrected to minimize an error between the integral value of the target data and the integral value of the predicted feature data.

In operation S233_3, an operation of training the machine learning model to decrease the result value of the loss function may be performed.

Figure 8:
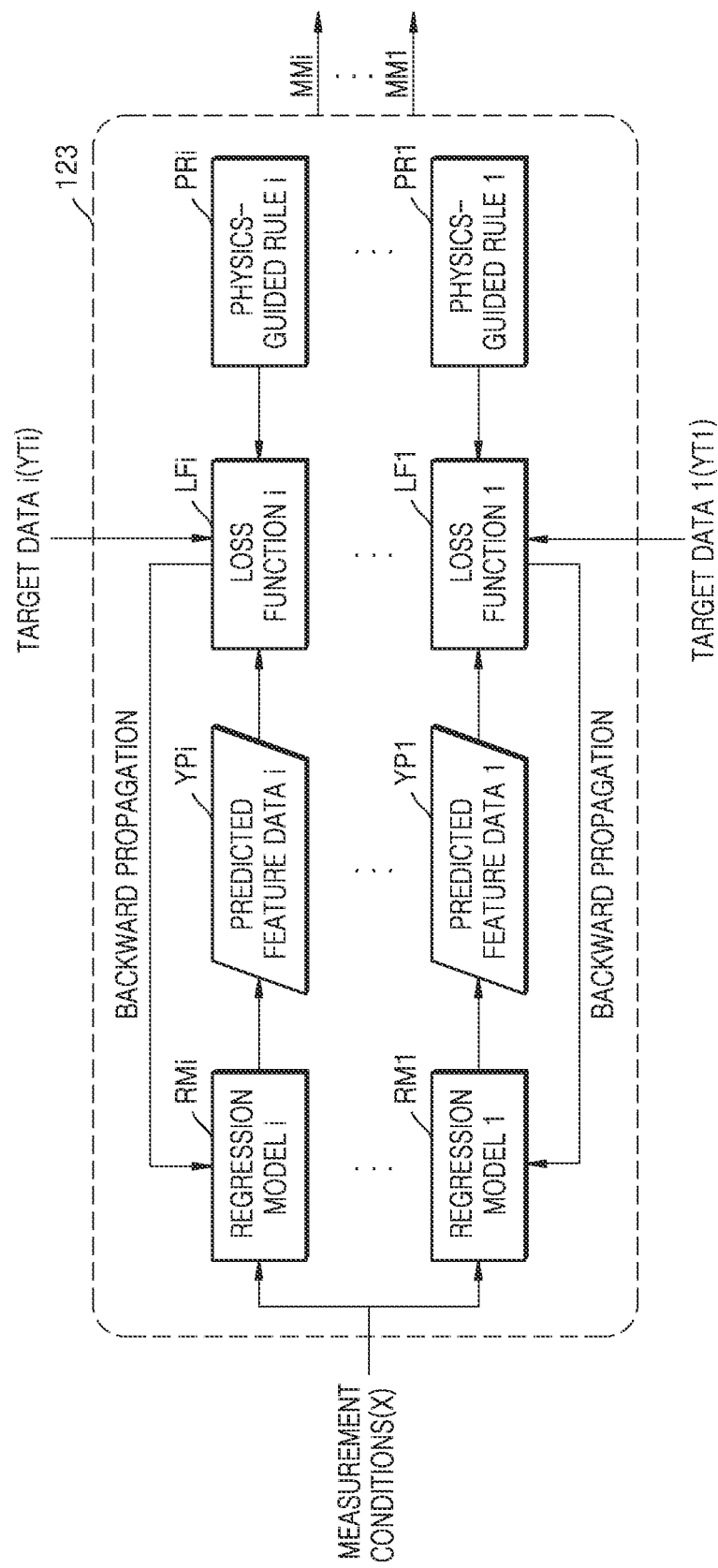
FIG. 8 is a diagram illustrating an example of a machine learning operation of FIG. 2 and an example of operation S23 of FIG. 5.

FIG. 8 is a diagram illustrating the machine learning operation of FIG. 2 and operation S23 of FIG. 5.

Referring to FIG. 8, in the machine learning operation 123, using the first regression model RM1 corresponding to the first target data YT1 of the first feature element, first predicted feature data YP1 according to measurement conditions X may be generated. In addition, in the machine learning operation 123, using the i-th regression model RMi corresponding to the i-th target data YTi of the i-th feature element, the i-th prediction feature data YPi according to the measurement conditions X may be generated.

The first loss function LF1 may be calculated based on an error between the first target data YT1 and the first predicted feature data YP1, and the i-th loss function LFi may be calculated based on an error between the i-th target data YTi and the i-th predicted feature data YPi. In some embodiments, the first loss function LF1 may be corrected based on the first physical guide rule PR1, and the i-th loss function LFi may be corrected based on the i-th physical guide rule PRi.

Based on the calculated values of backward propagation from each of the first loss function LF1 and the i-th loss function LFi, the first model parameters of the first regression model RM1 and the i-th model parameters of the i-th regression model RMi may be corrected. The first model parameters of the first regression model RM1 and the i-th model parameters of the i-th regression model RMi may be corrected so that the values of the first loss function LF1 and the i-th loss function LFi decrease. The first machine learning model MM1 and the i-th machine learning model MMi according to the first model parameters of the finally corrected first regression model RM1 and the i-th model parameters of the finally corrected i-th regression model may be extracted as a result of the machine learning operation 123.

Figure 9:
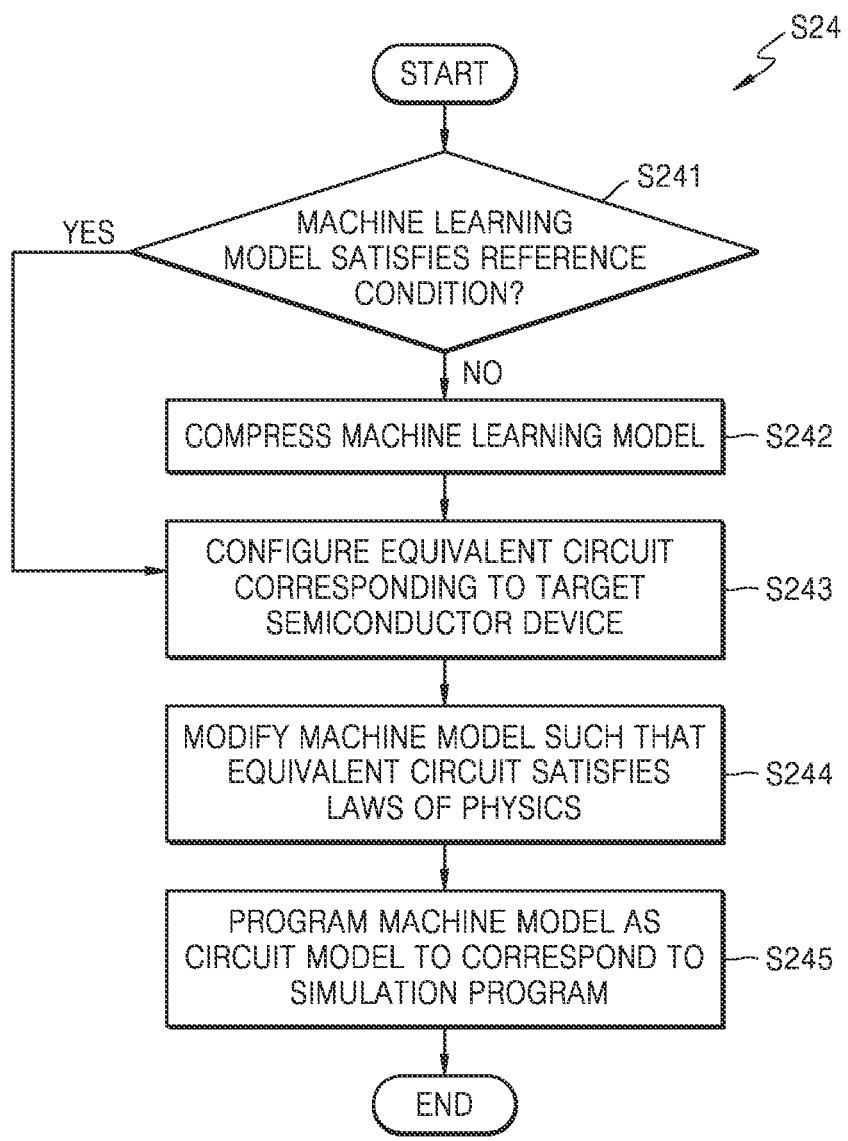
FIG. 9 is a flowchart showing a method of manufacturing an integrated circuit according to some exemplary embodiments of the present disclosure.

FIG. 9 is a flowchart showing a method of manufacturing an integrated circuit, according to some exemplary embodiments of the present disclosure. Operation S24 of FIG. 9 may be an example of operation S24 of FIG. 1, and may include operations S241 to S245.

Referring to FIG. 9, in operation S241, an operation of determining whether the machine learning model extracted in operation S23 satisfies a reference condition may be performed. For example, it may be determined whether the inference time of the machine learning model exceeds a reference time, or it may be determined whether a storage capacity for storing the machine learning model exceeds a reference value. When the inference time of the machine learning model exceeds the reference time, or the storage capacity for storing the machine learning model as a circuit model exceeds the reference value, because the load is increased to simulate the integrated circuit using the machine learning model, operations S241 and S242 may be performed so that excessive load is not generated in the simulation operation.

If the machine learning model does not satisfy the reference condition, in operation S242, an operation of compressing the machine learning model may be performed to reduce the complexity of the machine learning model. A compression operation capable of reducing the complexity of the machine learning model may be performed while maintaining the consistency of the machine learning model. Operation S242 will be described later in detail with reference to FIGS. 10 and 11.

After the machine learning model satisfies the reference condition or the model parameters are compressed, in operation S243, an operation of configuring an equivalent circuit corresponding to the target semiconductor device may be performed using a machine learning model. In operation S244, an operation of modifying the machine learning model may be performed so that the equivalent circuit satisfies the laws of physics. Operations S243 and S244 will be described later with reference to FIG. 12.

In operation S245, an operation of programming the machine learning model as a circuit model to correspond to the simulation program may be performed. For example, a machine learning model finally constructed in the form of an equivalent circuit may be programmed into a circuit model in the form of an equivalent circuit using the model Application Program Interface (API) provided by commercial EDA software, so that EDA circuit analysis may be performed.

Figure 10:
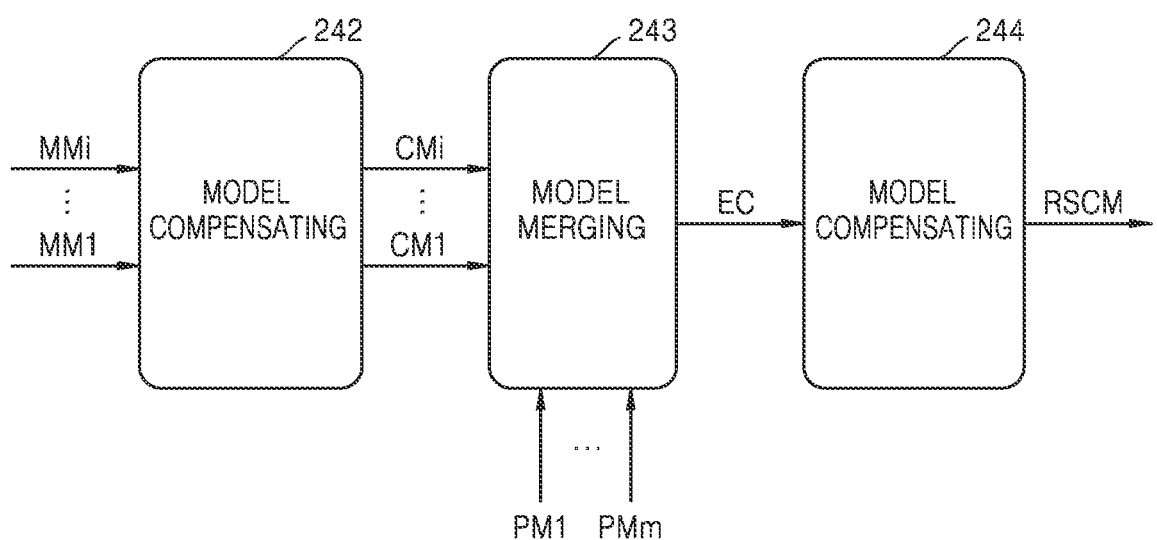
FIG. 10 is a diagram illustrating an example of an operation of mounting the machine learning model according to operations S242 to S244 of FIG. 9 as a circuit model in a simulation tool.
Figure 11:
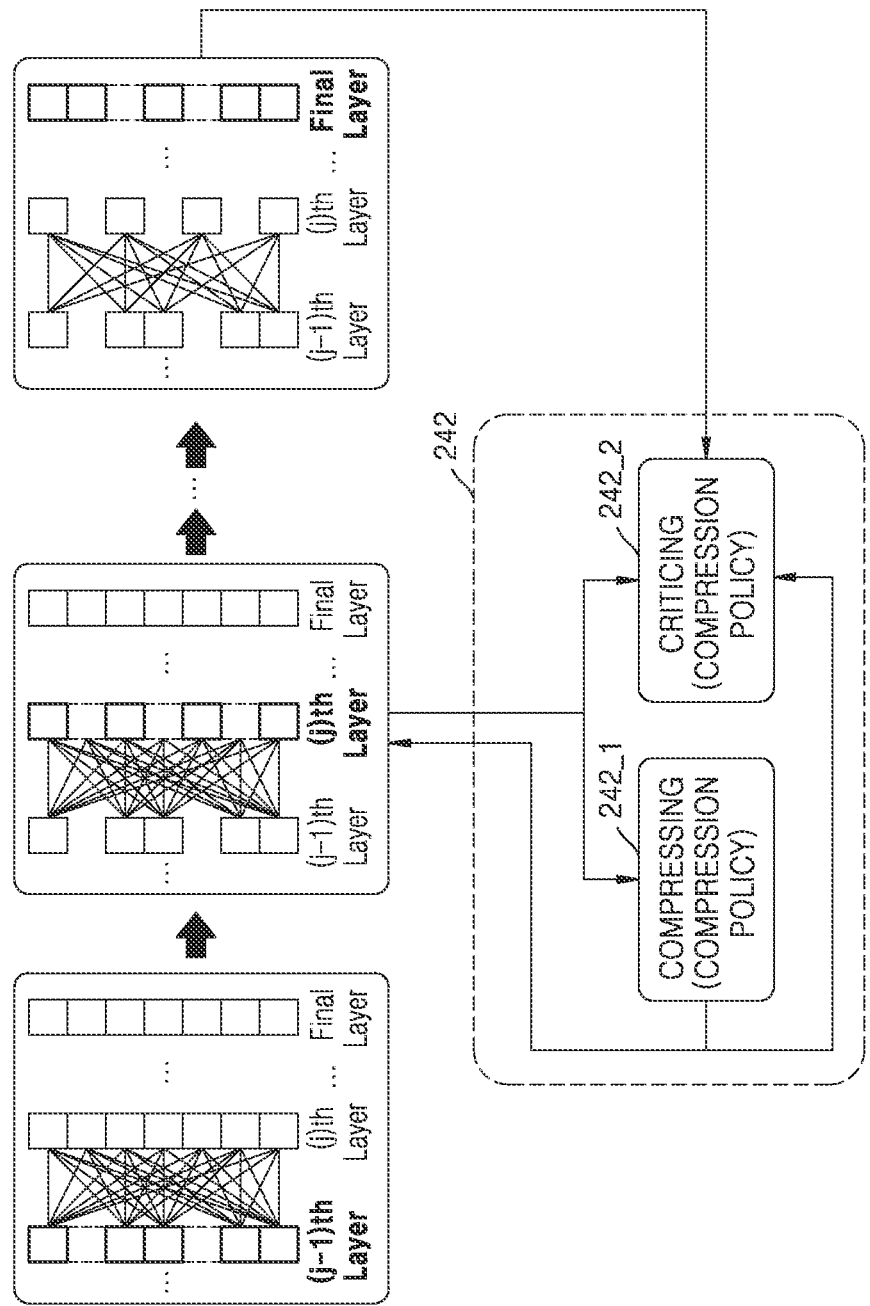
FIG. 11 is a diagram for explaining an example of a model compression operation of FIG. 10, and a diagram for explaining a case where a machine learning model is a neural network model.
Figure 12:
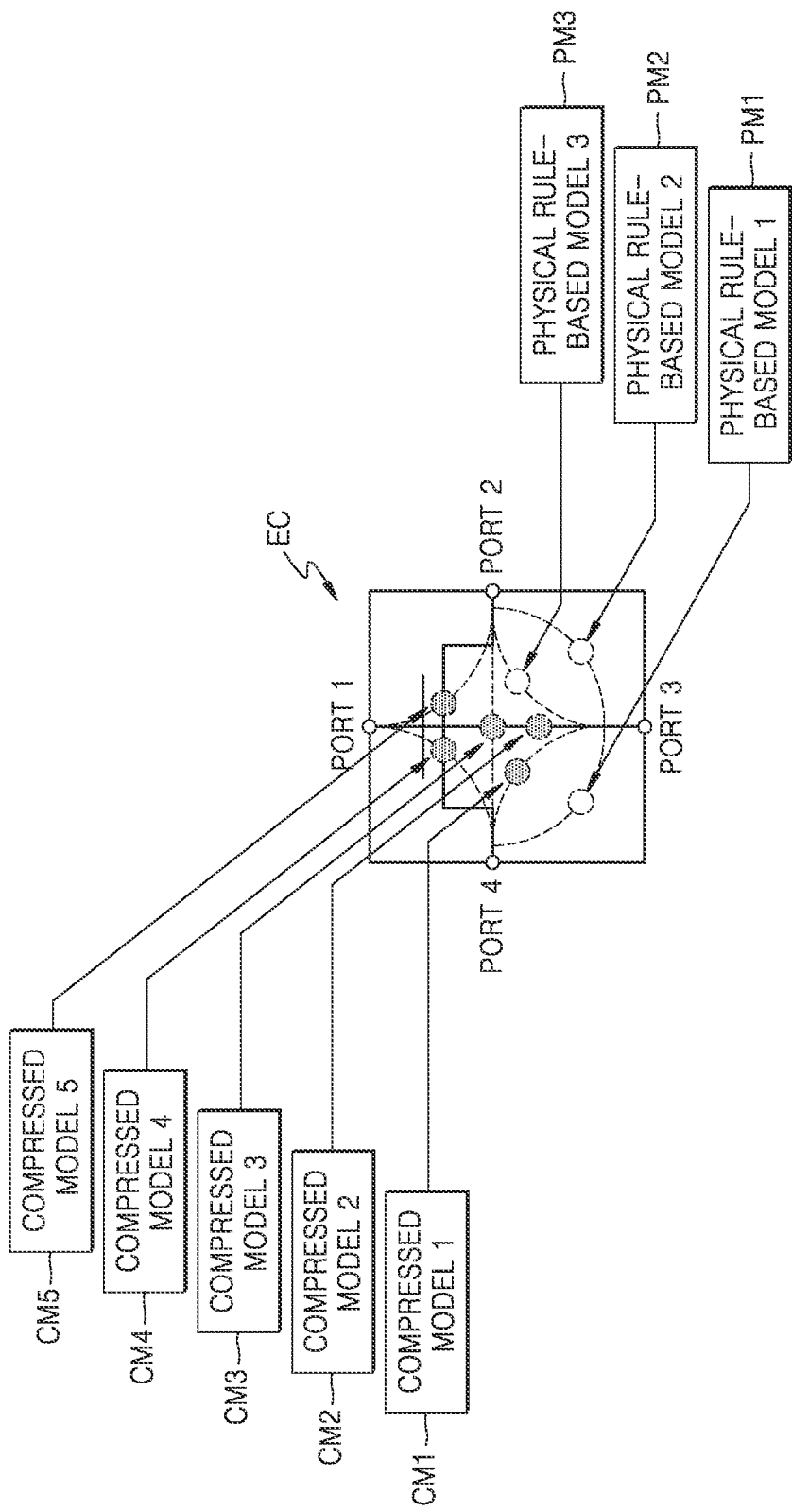
FIG. 12 is a diagram illustrating an example of a model merging operation of FIG. 10.

FIG. 10 is a diagram illustrating an example of an operation of mounting the machine learning model according to operations S242 to S244 of FIG. 9 as a circuit model in a simulation tool. FIG. 11 is a diagram for describing an example of a model compression operation of FIG. 10. FIG. 12 is a diagram illustrating an example of a model merging operation of FIG. 10.

Referring to FIG. 10, a model compression operation 242 for compressing at least a portion of the first to i-th machine learning models MM1 to MMi may be performed. For example, an operation 242 of compressing a machine learning model that does not satisfy a reference condition among the first to i-th machine learning models MM1 to MMi may be performed. In FIG. 10, for convenience of description, a case is described where each of the first to i-th machine learning models MM1 to MMi are compressed through the model compression operation 242 and the first to i-th compressed models CM1 to CMi are generated, but the present disclosure is not limited thereto. The model compression operation 242 may include an operation of reducing the number of model parameters of at least some of the first to i-th machine learning models MM1 to MMi.

Referring to FIG. 11, the model compression operation 242 may include a compression operation 242_1 for performing compression according to a compression policy and an operation 242_2 for evaluating a compression policy. Referring to FIG. 11, for convenience of explanation, a case is described where the machine learning model is a neural network model, but the present disclosure is not limited thereto.

The neural network model may include multiple layers. Each layer of the neural network model may include a plurality of nodes referred to as neurons. Each node or neuron may represent a unit of computation with one or more inputs and outputs. Each input from a plurality of nodes in a layer may be supplied from each node in an adjacent layer. Similarly, outputs of a plurality of nodes in a layer may be supplied to a plurality of nodes in an adjacent layer. Each node of a specific layer of the neural network model may be connected to at least some nodes of an adjacent layer.

A rate (e.g., a pruning rate) for reducing the number of model parameters of the machine learning model may be determined according to the compression policy. In some embodiments, the compression policy may be determined through reinforcement learning. When the machine learning model is a neural network model, a compression policy may be determined from a state of each of a plurality of layers, and whether to sequentially perform a compression operation of each of a plurality of layers may be determined. The model compression operation 242 may determine whether to perform the compression operation 242_1 on the (j−1)-th layer, and then determine whether to perform the compression operation 242_1 on the j-th layer, and after that, determine whether to perform the compression operation 242_1 for the last layer. The number of nodes connected to nodes of an adjacent layer may be reduced in a specific layer on which the compression operation 242_1 is determined. For example, the state of each of the plurality of layers may include the index of the layer, the number of neurons, the model weight reduction index, the weight reduction budget used so far, the weight reduction budget remaining in the future, the compression operation in the previous operation, and the like.

The operation 242_2 of evaluating the compression policy may evaluate the consistency of the compressed model according to the result of performing the compression operation 242_1, and may include an operation of changing a compression policy value according to the evaluation result. For example, if it is determined that the matching degree of the compressed model compressed according to the compression operation 242_1 is less than the reference matching degree, the operation of evaluating the compression policy 242_2 may include an operation of changing the compression policy such that a ratio of reducing the number of model parameters is reduced.

Referring again to FIG. 10, by merging the first to i-th compressed models CM1 to CMi and the first to m-th physical rule-based models PM1 to PMm, and by using the merged model, a model merging operation 243 constituting the equivalent circuit EC corresponding to the target semiconductor device may be performed. In some embodiments, the sum of i and m may be equal to n in FIG. 2.

Machine learning models may be created by training (or learning) based on massive sample data, and the physical rule-based model may be generated by at least one rule defined based on physical laws or the like. Machine learning models and physical rule-based models may have different characteristics, and thus, different advantages and disadvantages in addition to different application fields. Therefore, in relation to the method of manufacturing an integrated circuit according to the present disclosure, in modeling the properties of the target semiconductor device, because hybrid models including first to i-th machine learning models MM1 to MMi and first to m-th physical rule-based models PM1 to PMm are used, the disadvantages of the machine learning model and the physical rule-based model may be minimized and the advantages may be maximized.

However, in contrast to FIG. 10, a physical rule-based model may not be included in the circuit model, or only machine learning models may be included. According to the properties of the target semiconductor device, the target semiconductor device may be modeled to include only machine learning models, or the target semiconductor device may be modeled to include only physical rule-based models, or the target semiconductor device may be modeled as a hybrid model including both a machine learning model and a physical rule-based model.

A model compensation operation 244 for compensating the equivalent circuit EC to satisfy the laws of physics may be performed. The model compensation operation 244 may include an operation of correcting at least one of the first to i-th compressed models CM1 to CMi and the first to m-th physical rule-based models PM1 to PMm constituting the equivalent circuit EC to ensure that the equivalent circuit EC satisfies Kirchhoff's Current Law (KCL) and Kirchhoff's Voltage Law (KVL). A modified circuit model RSCM may be generated by the model compensation operation 244.

Referring to FIG. 12, a transistor that is a target semiconductor device may be modeled by an equivalent circuit EC including first to fifth compressed models CM1 to CM5, first to third physical rule-based models PM1 to PM3, and first to fourth ports. The first to fourth ports may be input/output ports of the target semiconductor device.

The first port may correspond to the gate of the transistor, the second port may correspond to the source of the transistor, the third port may correspond to the body of the transistor, and the fourth port may correspond to the drain of the transistor. For example, the body-drain current of the transistor may be modeled by the first compressed model CM1, the body-channel current of the transistor may be modeled by the second compressed model CM2, the drain-source current of the transistor may be modeled by the third compressed model CM3, the gate-drain voltage of the transistor may be modeled by the fourth compressed model CM4, and the gate-source voltage of the transistor may be modeled by the fifth compressed model CM5. Alternatively, for example, the voltage between the drain and the body of the transistor may be modeled by the first physical rule-based model PM1, the voltage between the source and the body of the transistor may be modeled by the second physical rule-based model PM2, and the body-source current may be modeled by the third physical rule-based model PM3.

The equivalent circuit EC may be configured to satisfy KCL and KVL based on each of the first to fourth ports. For example, the first to fifth compressed models CM1 to CM5 and the first to third physical rule-based models PM1 to PM3 may be corrected so that the sum of the currents inputted to the first to fourth ports becomes 0. Or, for example, the first to fifth compressed models CM1 to CM5, and the first to third physical rule-based models PM1 to PM3 may be corrected so that the sum of voltages between the first to fourth ports becomes 0.

Figure 13:
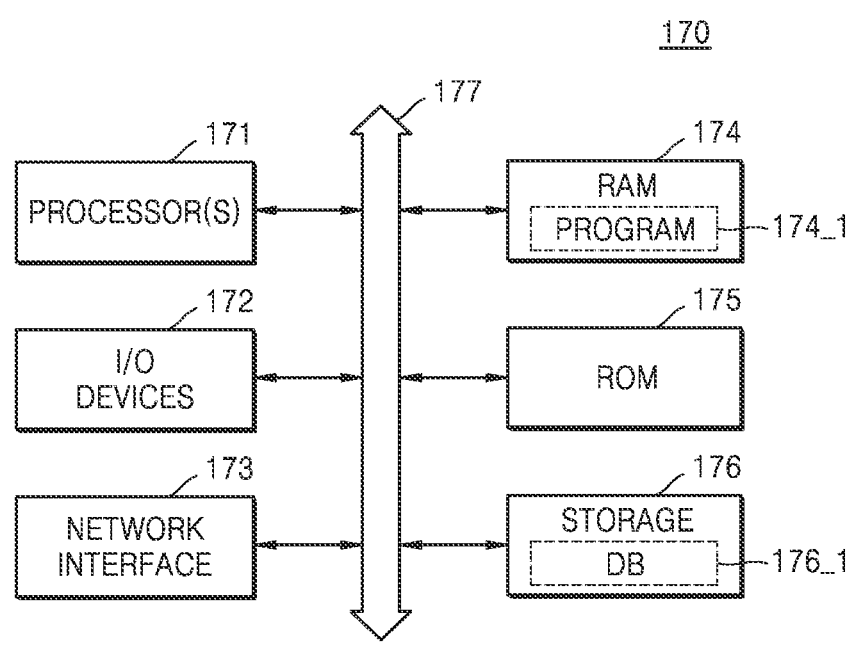
FIG. 13 is a block diagram showing a computing system including a memory storing a program according to some exemplary embodiments of the present disclosure.

FIG. 13 is a block diagram showing a computing system including a memory storing a program according to some exemplary embodiments of the present disclosure. At least some of the operations of generating a circuit model by modeling properties of a target semiconductor device may be performed by a computing system 170. In some embodiments, the computing system 170 may be referred to as a system for modeling properties of a target semiconductor device.

The computing system 170 may be a stationary computing system such as a desktop computer, a workstation, a server, or the like, or may be a portable computing system such as a laptop computer. As shown in FIG. 13, the computing system 170 may include a processor 171, input/output devices 172, a network interface 173, random access memory (RAM) 174, read only memory (ROM) 175, and a storage device 176. The processor 171, the input/output devices 172, the network interface 173, the RAM 174, the ROM 175, and the storage device 176 may be connected to a bus 177, and may communicate with each other through the bus 177.

The processor 171 may be referred to as a processing unit, and for example, may include at least one core capable of executing an arbitrary instruction set (e.g., Intel Architecture-32 (IA-32), 64-bit extension IA-32, x86-64, PowerPC, Sparc, MIPS, ARM, IA-64, or the like), such as a microprocessor, an application processor (AP), a digital signal processor (DSP), and a graphics processing unit (GPU). For example, the processor 171 may access memory, that is, the RAM 174 or the ROM 175, through the bus 177, and may execute instructions stored in the RAM 174 or the ROM 175.

The RAM 174 may store a program 174_1 or at least a part thereof for performing a method of modeling properties of a target semiconductor device and generating a circuit model, and the program 174_1 may allow the processor 171 to perform at least some of the operations included in the method of generating a circuit model. That is, the program 174_1 may include a plurality of instructions executable by the processor 171, and a plurality of instructions included in the program 174_1 may allow the processor 171 to perform at least some of the operations included in the above-described method.

The storage device 176 may not lose stored data even when the power supplied to the computing system 170 is cut off. For example, the storage device 176 may include a nonvolatile memory device or a storage medium such as a magnetic tape, an optical disk, or a magnetic disk. Further, the storage device 176 may be detachable from the computing system 170. The storage device 176 may store the program 174_1 according to some exemplary embodiments of the present disclosure, and before the program 174_1 is executed by the processor 171, the program 174_1 or at least a portion thereof may be loaded from the storage device 176 into the RAM 174. Alternatively, the storage device 176 may store a file written in a program language, and the program 174_1 generated by a compiler or the like from a file or at least a part thereof may be loaded into the RAM 174. In addition, as shown in FIG. 13, the storage device 176 may store the database 176_1, and the database 176_1 may include information necessary to perform a method of a hybrid model, for example, sample data.

The storage device 176 may store data to be processed by the processor 171 or data processed by the processor 171. That is, the processor 171 may generate data by processing data stored in the storage device 176 according to the program 174_1 and may store the generated data in the storage device 176.

The input/output devices 172 may include an input device such as a keyboard and a pointing device, and may include an output device such as a display device and a printer. For example, the user may trigger the execution of the program 174_1 by the processor 171, input learning data, and check result data through the input/output devices 172.

The network interface 173 may provide access to a network external to the computing system 170. For example, a network may include multiple computing systems and communication links, and the communication links may include wired links, optical links, wireless links, or any other type of links.

Figure 14:
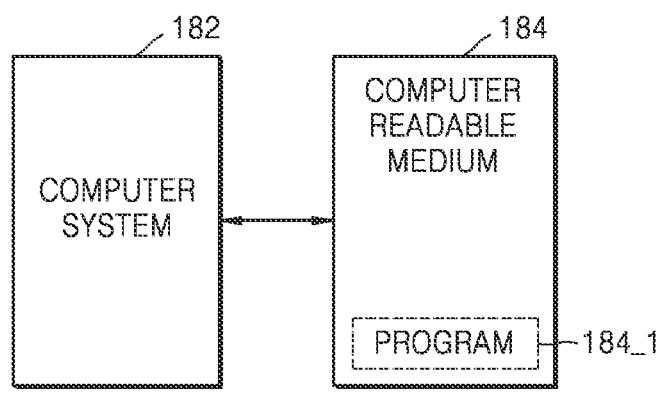
FIG. 14 is a block diagram showing a computer system accessing a storage medium storing a program according to some exemplary embodiments of the present disclosure.

FIG. 14 is a block diagram showing a computer system accessing a storage medium storing a program according to some exemplary embodiments of the present disclosure. At least some of the operations of modeling properties of a target semiconductor device and generating a circuit model may be performed by the computer system 182. The computer system 182 may access the computer-readable medium 184 and execute the program 184_1 stored in the computer-readable medium 184. In some exemplary embodiments, the computer system 182 and the computer-readable medium 184 may be collectively referred to as a system for modeling properties of a target semiconductor device.

The computer system 182 may include at least one computer subsystem, and the program 184_1 may include at least one component executed by at least one computer subsystem. For example, at least one component may include the machine learning models described above with reference to the drawings, and may include a model trainer that trains the machine learning model or modifies the machine learning model. Similar to the storage device 176 of FIG. 13, the computer-readable medium 184 may include a nonvolatile memory device or a storage medium such as a magnetic tape, an optical disk, and a magnetic disk. Further, the computer-readable medium 184 may be detachable from the computer system 182.

FIG. 15 is a flowchart illustrating a method of manufacturing an integrated circuit, according to some exemplary embodiments of the present disclosure. Operations S40 and S50 of FIG. 15 may be performed after operation S30 of FIG. 1.

In operation S40, a result of simulating properties of the integrated circuit may be obtained. The simulation operation may be performed using the generated circuit model by performing the modeling operation (e.g., S20 of FIG. 1) of the target semiconductor device described with reference to FIGS. 1 to 13. A circuit model with improved consistency may be generated through machine learning operations, and because the consistency is improved and/or further improved by merging the machine learning model with the physical rule-based model according to the existing physical equation, the accuracy of the simulation result for the properties of the integrated circuit may be improved.

In operation S50, based on the simulation result, an operation of manufacturing an integrated circuit including the target semiconductor device by a semiconductor process may be performed. For example, the integrated circuit may be manufactured by a semiconductor process to which process parameters finally adjusted in operation S50 are applied. The semiconductor process may include a front-end-of-line (FEOL) process and a back-end-of-line (BEOL) process using masks fabricated based on an integrated circuit. For example, the FEOL process may include planarizing and cleaning a wafer, forming a trench, forming a well, forming a gate line, and forming a source and a drain. Also, the BEOL process may include performing silicidation on a gate, a source and a drain, adding a dielectric, performing planarization, forming a hole, adding a metal layer, forming a via, and forming a passivation layer. The integrated circuit manufactured in operation S50 may have properties similar to the simulation result obtained in operation S40 due to the high consistency of the circuit model acquired in operation S24 of FIG. 1. Accordingly, the time and cost for manufacturing an integrated circuit with good properties may be saved, and an integrated circuit with better properties may be manufactured.

While the inventive concepts of the present disclosure have been particularly shown and described with reference to some exemplary embodiments thereof, it will be understood that various changes in form and details may be made therein without departing from the scope of the following claims.

What is claimed is:

1. A method of generating a circuit model used to simulate an integrated circuit, the method comprising:
    generating first feature element data and second feature element data by classifying feature data of a target semiconductor device according to measurement conditions, wherein the first feature element data and the second feature element data are based on feature elements independent to each other;
    generating first target data and second target data by preprocessing the first feature element data and the second feature element data, respectively;
    extracting a first machine learning model using the first target data and extracting a second machine learning model using the second target data; and
    generating the circuit model used to simulate the integrated circuit by using the first machine learning model and the second machine learning model.

2. The method of claim 1, wherein the generating of the first target data and the second target data comprises preprocessing each of the first feature element data and the second feature element data based on at least one of a parasitic capacitance and/or a parasitic resistance of the target semiconductor device.

3. The method of claim 1, wherein the extracting of the first machine learning model and the second machine learning model comprises:
    selecting a first regression model corresponding to the first target data, and selecting a second regression model corresponding to the second target data;
    generating first predicted feature data of the target semiconductor device using the selected first regression model, and generating second predicted feature data of the target semiconductor device using the selected second regression model; and
    training the first machine learning model based on an error between the first predicted feature data and the first target data, and training the second machine learning model based on an error between the second predicted feature data and the second target data.

4. The method of claim 3, wherein the training of the first machine learning model and the second machine learning model comprises:
    calculating a first loss function based on the first predicted feature data and the first target data, and calculating a second loss function based on the second predicted feature data and the second target data;
    correcting the first loss function to reflect a first physical guide rule, and correcting the second loss function to reflect a second physical guide rule; and
    training the first machine learning model to decrease a result value of the first loss function, and training the second machine learning model to decrease a result value of the second loss function.

5. The method of claim 3, wherein the first regression model and the second regression model are different regression models.

6. The method of claim 1, wherein the generating of the circuit model using the first machine learning model and the second machine learning model further comprises,
    when a storage capacity for storing the first machine learning model exceeds a reference value, or when an inference time of the first machine learning model exceeds a reference time, compressing the first machine learning model such that a number of model parameters of the first machine learning model is reduced.

7. An integrated circuit manufacturing method comprising:
- generating first feature element data and second feature element data by classifying feature data of a target semiconductor device according to measurement conditions;
- generating first target data and second target data by preprocessing the first feature element data and the second feature element data, respectively;
- extracting a first machine learning model by using the first target data; and
- generating a circuit model corresponding to the target semiconductor device by using the first machine learning model,
- wherein the extracting the first machine learning model includes selecting a first regression model corresponding to the first target data, generating first predicted feature data of the target semiconductor device using the first regression model, and training the first machine learning model based on an error between the first predicted feature data and the first target data, and
- wherein the training the first machine learning model includes calculating a first loss function based on the first predicted feature data and the first target data, correcting the first loss function to reflect a physical guide rule, and training the first machine learning model to decrease a result value of the first loss function.

8. The method of claim 7, wherein the generating of the first target data and the second target data comprises preprocessing a first feature element data and a second feature element data, respectively, based on at least one of a parasitic capacitance and/or a parasitic resistance of the target semiconductor device.

9. The method of claim 7, wherein the measurement conditions comprise a process condition of the target semiconductor device and an operating condition of an environment in which the target semiconductor device operates.

10. The method of claim 7, wherein the generating of the circuit model using the first machine learning model comprises compressing the first machine learning model to reduce a number of model parameters of the first machine learning model according to a compression policy.

11. The method of claim 10, wherein the generating of the circuit model using the first machine learning model comprises changing the compression policy according to a result of an evaluation of a consistency of the compressed first machine learning model.

12. The method of claim 7, wherein the generating of the circuit model using the first machine learning model comprises:
- extracting a physical rule-based model corresponding to the first target data; and
- generating the circuit model using the first machine learning model and the physical rule-based model.

13. The method of claim 7, wherein the generating of the circuit model using the first machine learning model comprises:
- configuring an equivalent circuit corresponding to the target semiconductor device by using the first machine learning model; and
- modifying the first machine learning model so that the equivalent circuit satisfies at least one physical law.

14. An integrated circuit manufacturing method comprising:
- classifying feature data of a target semiconductor device according to measurement conditions as feature element data based on a plurality of feature elements of the target semiconductor device, wherein the feature elements are independent of each other;
- generating target data by preprocessing feature element data corresponding respectively to the plurality of feature elements;
- extracting machine learning models corresponding to the plurality of feature elements, respectively, by using the target data; and
- generating a circuit model corresponding to the target semiconductor device using the machine learning models,
- wherein the generating the circuit model includes compressing the machine learning models such that a number of model parameters of the machine learning models is reduced and configuring an equivalent circuit corresponding to the target semiconductor device by merging the compressed machine learning models with physical rule-based models corresponding to the target data such that the equivalent circuit satisfies at least one law of physics.

15. The method of claim 14, wherein the extracting of the machine learning models comprises:
- selecting regression models corresponding to the target data;
- generating predicted feature data of the target semiconductor device using the regression models; and
- training the machine learning models based on an error between the predicted feature data and the target data.

16. The method of claim 15, wherein the training of the machine learning models comprises:
- calculating loss functions based on the predicted feature data and the target data; and
- training the machine learning models to decrease a result value of the loss functions.

* * * * *